(12) United States Patent
Zadeh et al.

(10) Patent No.: US 6,375,723 B1
(45) Date of Patent: Apr. 23, 2002

(54) APPARATUS FOR IMPROVING GAS DISTRIBUTION IN A PREPURIFIER

(75) Inventors: Dariush Habibollah Zadeh, Amherst; Jeffert John Nowobilski, Orchard Park, both of NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

(21) Appl. No.: 09/568,627

(22) Filed: May 10, 2000

(51) Int. Cl.$^7$ .............................................. B01D 53/04
(52) U.S. Cl. .......................... 96/139; 96/152; 55/410; 55/418; 210/291
(58) Field of Search ...................... 55/344, 410, 418; 96/139–141, 143, 144, 152; 210/275, 279, 291–293

(56) References Cited

U.S. PATENT DOCUMENTS

| | | | | | |
|---|---|---|---|---|---|
| 1,577,200 A | * | 3/1926 | Voress et al. | ............. | 55/410 X |
| 1,772,023 A | * | 8/1930 | Andrews | ..................... | 55/410 |
| 1,847,304 A | * | 3/1932 | Bradshaw et al. | ............. | 55/344 |
| 2,152,115 A | * | 3/1939 | Van Tongeren | .............. | 55/344 |
| 2,180,119 A | * | 11/1939 | Osterloh et al. | ............... | 96/152 |
| 2,678,108 A | * | 5/1954 | Reid | ........................ | 55/344 X |
| 2,956,682 A | * | 10/1960 | Stephan | .................. | 210/279 X |
| 3,016,108 A | * | 1/1962 | Myddelton | .................... | 96/152 |
| 3,197,946 A | * | 8/1965 | Taylor | ....................... | 55/418 X |
| 3,479,146 A | * | 11/1969 | Hochman et al. | ......... | 55/418 X |
| 3,593,500 A | * | 7/1971 | Ritland et al. | ............. | 55/418 X |
| 3,646,595 A | * | 2/1972 | Williams | ................... | 55/410 X |
| 3,722,189 A | * | 3/1973 | Tourtellotte | .................. | 96/152 |
| 3,789,989 A | * | 2/1974 | Carson | .................... | 210/291 X |
| 3,925,041 A | * | 12/1975 | Patterson et al. | .......... | 96/152 X |
| 4,065,391 A | | 12/1977 | Farabaugh | ................... | 210/274 |
| 4,750,999 A | * | 6/1988 | Roberts et al. | ........... | 96/152 X |
| 4,938,422 A | | 7/1990 | Koves | ...................... | 239/553.5 |
| 5,298,226 A | | 3/1994 | Nowobilski | .................. | 422/171 |
| 5,538,544 A | | 7/1996 | Nowobilski et al. | .......... | 96/152 |
| 5,544,432 A | | 8/1996 | Westelaken | ................... | 34/174 |
| 5,716,427 A | | 2/1998 | Andreani et al. | .............. | 95/90 |
| 5,759,242 A | * | 6/1998 | Smolarek et al. | .......... | 96/144 X |
| 5,779,773 A | | 7/1998 | Cam et al. | ..................... | 96/152 |
| 5,873,929 A | * | 2/1999 | Andreani et al. | ......... | 96/152 X |

FOREIGN PATENT DOCUMENTS

| | | | | |
|---|---|---|---|---|
| EP | 0748253 B1 | | 2/1995 | |
| FR | 0844271 | * | 6/1939 | ................... 55/344 |
| JP | 61-178018 | * | 8/1986 | ................... 96/152 |

* cited by examiner

Primary Examiner—Robert H. Spitzer
(74) Attorney, Agent, or Firm—Robert J. Follett

(57) ABSTRACT

A distributor apparatus arrangement distributes a gas within a vessel that includes an adsorbent bed, the gas distribution occurring with a minimum of gas mal-distribution. The distributor apparatus includes an inlet gas coupler that feeds gas to a conduit oriented adjacent a surface of the bed. A slit opening is positioned in a wall of the conduit and extends along a length of the conduit. The slit has an opening extent near the inlet fluid coupler that is larger than an opening extent of the slit near the distal end of the conduit. The slit opening is oriented towards a wall of the vessel and away from the bed so as to enable gas flow that exits therefrom to impact upon the wall and be deflected thereby to the bed. In a preferred arrangement, the slit is defined by perforations that exhibit a 50% aperture ratio.

19 Claims, 5 Drawing Sheets

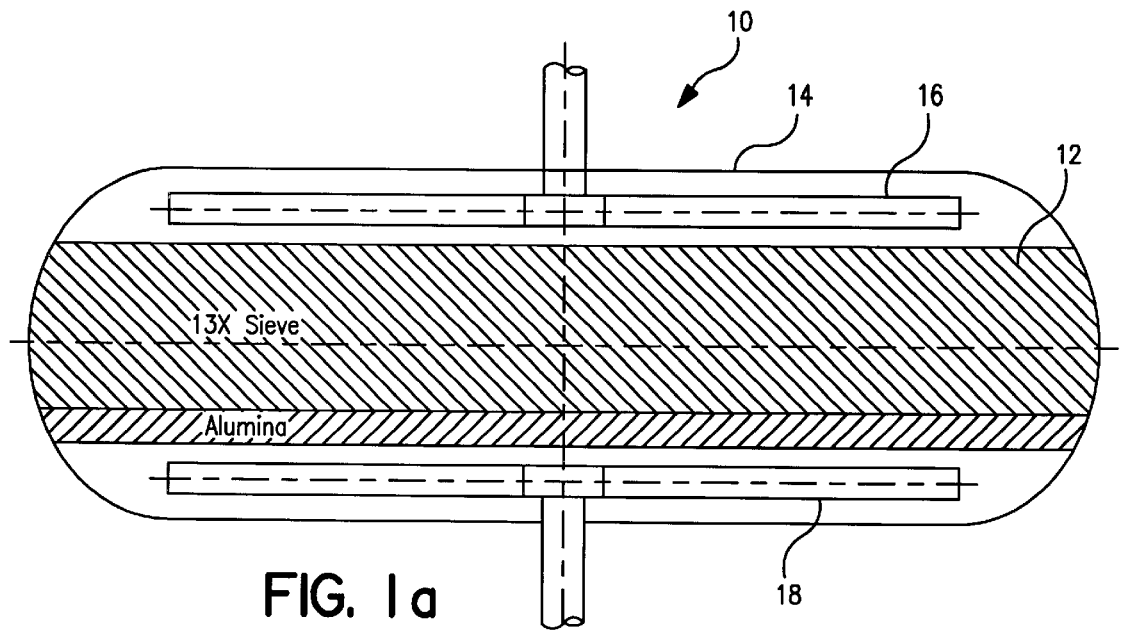
FIG. 1a
FIG. 1c
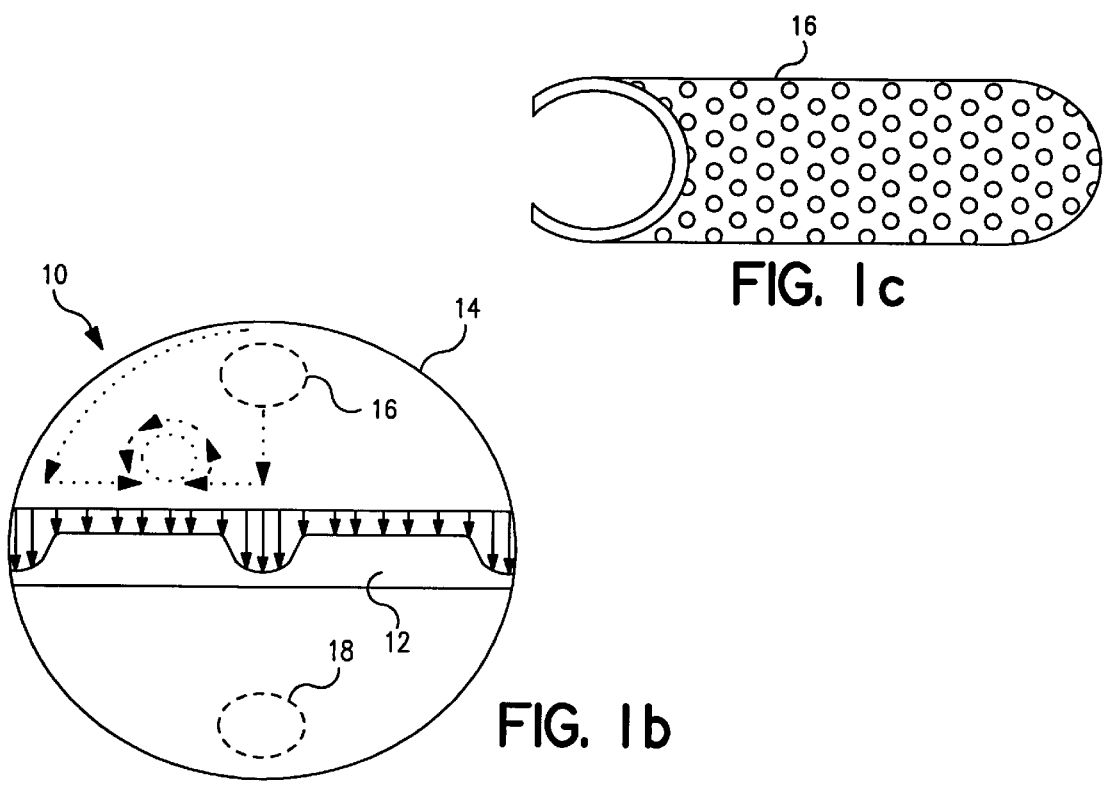
FIG. 1b

APPARATUS FOR IMPROVING GAS DISTRIBUTION IN A PREPURIFIER

FIELD OF THE INVENTION

This invention relates to prepurifiers employed in gas separation systems and, more particularly, to apparatus for improving gas distribution flow within such prepurifiers.

BACKGROUND OF THE INVENTION

Prepurifiers are used in cryogenic plants to reduce water, carbon dioxide and hydrocarbon inclusions in inlet air to ppm levels, prior to the air entering a cold box. The prepurifier keeps the water and carbon dioxide from freezing and plugging heat exchangers and aid in the safe operation of air separation plants. Prepurifiers adsorb the gases in alumina and 13X molecular sieve beds. The adsorbents are contained in, for example, horizontal vessels which are operated in alternating adsorption and regeneration cycles.

A horizontal prepurifier 10 is illustrated in FIG. 1a and positions bed 12 in the middle of vessel 14. An inlet air distributor 16 and an outlet air accumulator 18 are positioned in vessel 14 on opposite sides of adsorbent bed 12. Horizontal beds can be very large, i.e., up to 60' long by 16' diameter. Flow mal-distribution in prepurifiers can cause early breakthrough, loss of efficiency, sieve movement and local bed fluidization. The air flow patterns of horizontal bed 10 are shown in FIG. 1b.

There are two main types of mal-distribution in horizontal beds, namely axial, and radial. Axial mal-distribution is due to high flow mass exit of flow from the end of current distributors. FIG. 1c illustrates a prior art configuration used in the prepurifier of FIGS. 1a and 1b, where gas distributor 16 and gas accumulator 18 are perforated and have closed distal ends.

FIG. 1d is a chart that illustrates gas flow in distributor 16 of FIG. 1a and shows that more of the gas flow exits at 80% of the axial distance from the centerline of vessel 14. Such unbalanced flow can impact bed 12 at the end of the distributor and cause a sieve movement.

The prior art has utilized 50% perforated distributor shown in FIG. 1c along the length of the vessel for inlet and outlet flows of the prepurifier. It has been determined that up to 38% axial mal-distribution can be expected with this type of distributor for feed flows in a 16 ft dia., 60 ft length vessel.

Radial mal-distribution is a function of geometry of the bed. In radial mal-distribution, flow next to the vessel shell at the entrance or exit to bed is at a higher velocity than the flow in the center of the bed due to vessel curvature. A radial mal-distribution can be avoided by shallow beds or removing vessel curvature with an internal wall.

The prior art includes a number of teachings regarding solutions to flow distribution in vessels. U.S. Pat. No. 5,779,773 to Cam et al. illustrates a retaining grille in a vessel with a convex bottom. The grille has a curved shape and is located over the inlet pipe. The direction of convexity of the vault and the bottom of the vessel are opposite to each other obtaining a good diffusion of the gas. The grille is used to support an adsorbent bed in the vessel. The application of a grille for vertical and horizontal beds is discussed.

U.S. Pat. No. 5,716,427 to Andreani et al. describes a perforated region flow distributor for use on adsorbent beds which are generally of a radial flow design. The perforated region divides the annular channels into two sections, using variable size holes or a variable hole distribution to provide uniform flow to the adsorbent bed. In a second case, a perforated cylindrical bed support region diffuses the inlet jet and results in uniform flow to the outer channel.

European Patent Application EP 0748253 to Zardi et al. illustrates a vertical mixing assembly bed for gaseous flows at different temperatures for heterogeneous exothermic synthesis processes. The device has mixing assemblies to cool the partially reacted gas mixtures flowing through the bed and comprises a large vertical collector which runs from the top to the bottom of the bed at the center of vessel. The bed has several compartments which are fed by different assemblies.

U.S. Pat. No. 5,544,423 to Westelaken et al. describes a gas distributor with spatially separate gas deflectors. Each deflector positioned to successively cut the flow diagonally across the gas flow. The deflectors are configured to direct gas flow exiting the distributor in an essentially perpendicular direction to the direction of gas flow entering the distributor. A dryer for particulate material includes particulate material, particulate material inlets and outlets, a drying gas inlet and an exhaust gas outlet.

U.S. Pat. No. 4,938,422 to Koves describes an inlet distributor for vertical vessels. A two directional flow generator prevents bed surface disturbances at high inlet velocities and high particle loadings. The distributor uses a series of partitions to peel off portions of the downward gas flow and to redirect them radially outward. Each outwardly directed gas flow component passes through a series of perforations to effect any necessary circumferential redistribution before entering the space above the particle bed. By subdividing the gas flow into a number of radially directed flow portions and circumferentially redistributing these flow portions, cross-currents and eddy currents on the catalyst bed surface are minimized.

U.S. Pat. No. 4,065,391 to Farabaugh illustrates a distributor which supplies either a liquid or a gas to a bed of granular media. The vessel is divided by inclined interior walls into primary and secondary horizontal conduits that extend parallel to each other. A liquid or a gas is supplied to the primary conduits, passes through the metering orifices into the secondary conduits, and through dispersion orifices into the filter bed. The system uses an air backwashing prior to conventional liquid washing. The air bubbles up through the filter and provides a thorough agitation of the media, dislodging accumulated dirt and/or gelatinous floc which then can be removed by liquid backwashing.

U.S. Pat. No. 5,298,226 to Jeffert et al. provides uniform fluid flow in pressure swing adsorbent vertical vessels. The vessel has at least two perforated region fluid distributors positioned transversely with respect to a longitudinal axis of the vessel.

U.S. Pat. No. 5,538,544 to Jeffert et al. describes a non-uniform graded ball adsorbent bed support that is employed in the head section of an adsorption vertical vessel to achieve a uniform flow of gas in bed. The open area of the inlet gas distributor is modified to channel gas toward the edge portion of the vessel head to enhance the uniform flow of gas to the adsorbent bed.

There remains a need for an improved air distributor that is of simple construction and provides a relatively uniform air distribution throughout a prepurifier vessel.

SUMMARY OF THE INVENTION

A distributor apparatus arrangement distributes a gas within a vessel that includes an adsorbent bed, the gas distribution occurring with a minimum of gas mal-distribution. The distributor apparatus includes an inlet gas coupler that feeds gas to a conduit oriented adjacent a surface of the bed. A slit opening is positioned in a wall of the conduit and extends along a length of the conduit. The slit has an opening extent near the inlet fluid coupler that is larger than an opening extent of the slit near the distal end of the conduit. The slit opening is oriented towards a wall of the vessel and away from the bed so as to enable gas flow that exits therefrom to impact upon the wall and be deflected thereby to the bed. In a preferred arrangement, the slit is defined by perforations that exhibit a 50% aperture ratio.

BRIEF DESCRIPTION OF THE DRAWINGS

FIG. 1a is a schematic of a prior art horizontal prepurifier.

FIG. 1b is a schematic cross-sectional view of the prepurifier of FIG. 1a showing gas flow therein.

FIG. 1c illustrates the perforation arrangement of the distributor of FIG. 1a.

FIG. 2b is a top view of the embodiment of FIG. 2a.

FIG. 2c is a perspective view of the first distributor embodiment of FIG. 2a.

FIG. 3a is a sectional view of the distributor embodiment of FIG. 2a.

FIG. 3b illustrates flow mal-distribution that results from the distributor embodiment of FIG. 2a.

FIG. 4a is a perspective view of a modification of the first distributor embodiment of FIG. 2a.

FIG. 4b is a sectional view of the embodiment of FIG. 4a.

FIG. 4c illustrates flow mal-distribution that results from the distributor embodiment of FIG. 4a.

DETAILED DESCRIPTION OF THE PREFERRED EMBODIMENT

Figure 2A:
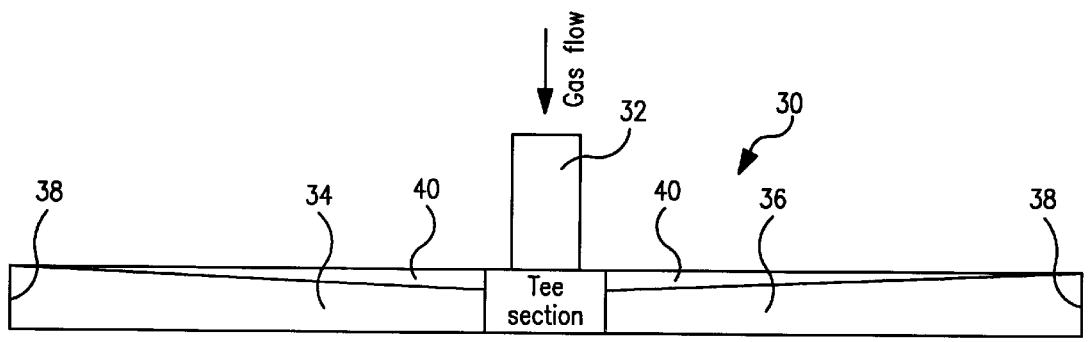
FIG. 2a is a side view of a first distributor embodiment that embodies the invention.

Referring to FIG. 2a, a gas distributor 30 is illustrated that is constructed in accordance with the first embodiment of the invention. A Tee section 32 receives an inlet gas flow and distributes the gas flow between distributor arms 34 and 36. Each of distributor arms 34 and 36 is preferably circular in cross section and includes a closed end 38 at its distal extremity. The uppermost surface of each of distributor arms 34 and 36 is cut away to form an elongated triangular slit 40.

Figure 2B:
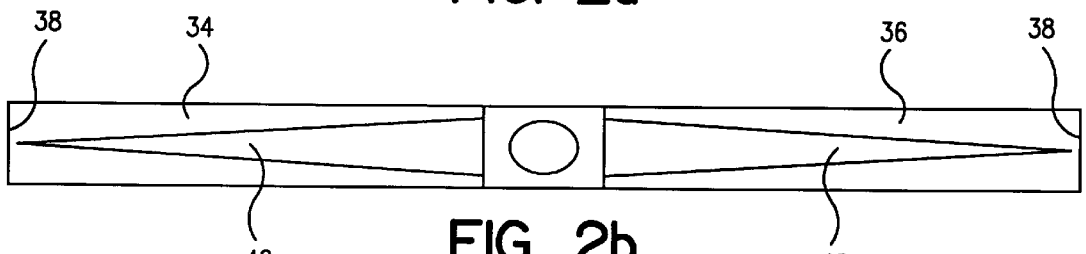
Figure 2C:
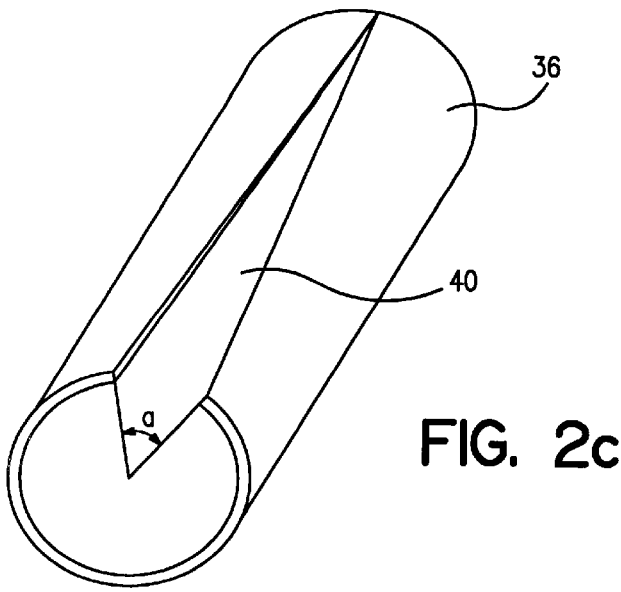

FIG. 2b is a top view of the distributor arm arrangement of FIG. 2a and shows slits 40 as they are respectively positioned on arms 34 and 36. FIG. 2c illustrates a perspective view of the positioning of slit 40 in distributor arm 36. A preferred angular opening α of the proximal end of slit 40 is about 60°, but this angular opening may be varied in accordance with desired gas flows rates and quantities.

Figure 1D:
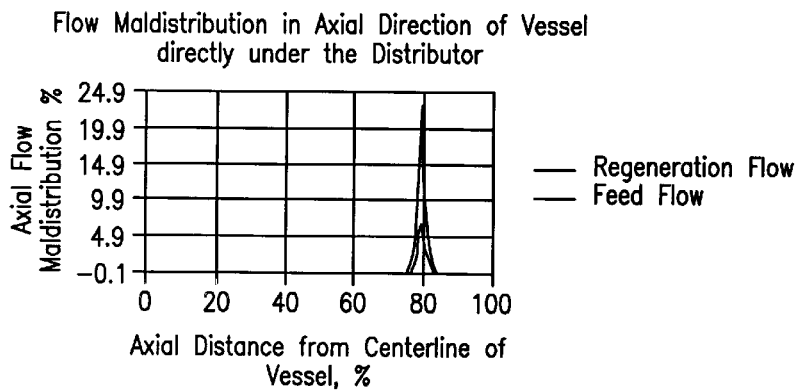
FIG. 1d illustrates flow mal-distribution that results from the prior art distributor of FIG. 1c.
Figure 3A:
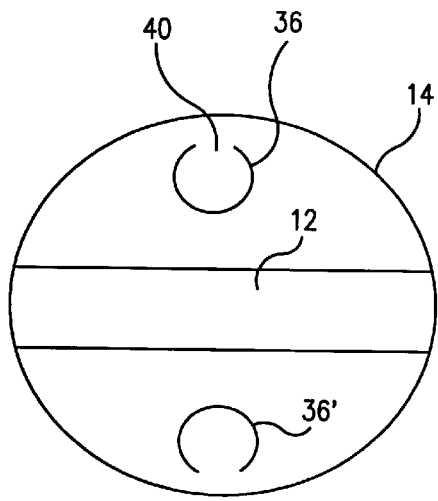
Figure 3B:
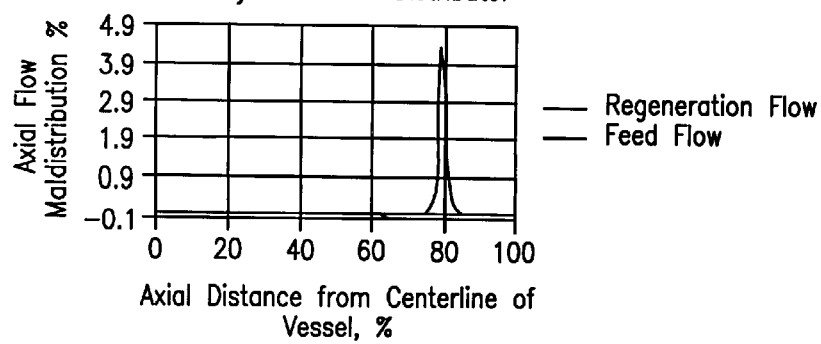

Referring to FIG. 3a, the relative positions of distributor arm 36 and accumulator arm 36' are illustrated with respect to bed 12 and vessel wall 14. Note that slit 40 in distributor 36 is positioned so that the gas flow therefrom impacts upon vessel wall 14 and is directed downwardly thereby towards bed 12. FIG. 3b illustrates the flow mal-distribution that occurs along each of distributor arm 36 when a slit 40 is positioned therein. Note, in comparison to the flow distribution shown in FIG. 1d where an approximately 20% flow mal-distribution occurs, that the distributor embodiment of FIGS. 2a–2c results in a flow mal-distribution that is slightly in excess of 4%.

Accordingly, by having the maximum opening of slit 40 near the gas entry from Tee section 32, and then causing the slit opening to decrease progressively in the direction of end 38 of each distributor arm, enables significant improvement in the gas mal-distribution that exits from the respective distributor arms. It is preferred that accumulator arm 36' have the same configuration as distributor arm 36, with slit opening directed downwardly towards vessel wall 14.

Figure 4A:
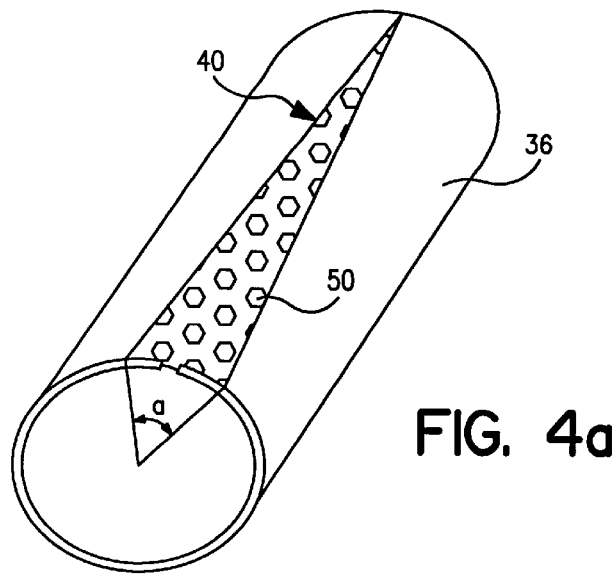
Figure 4B:
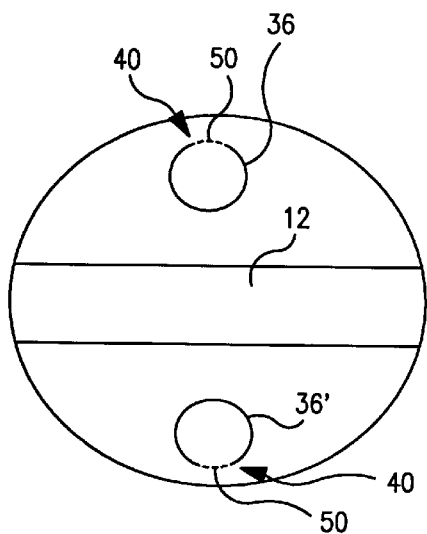

Turning to FIG. 4a, slit 40 in distributor arm 36 is configured as a perforated region 50 that exhibits an approximately 50% ratio of perforation area to slit region area. FIG. 4b shows that the relative positioning of arms 36 and 36' is identical to that shown in FIG. 3a, except that distributor arm 36 is provided with perforated region 50.

Figure 4C:
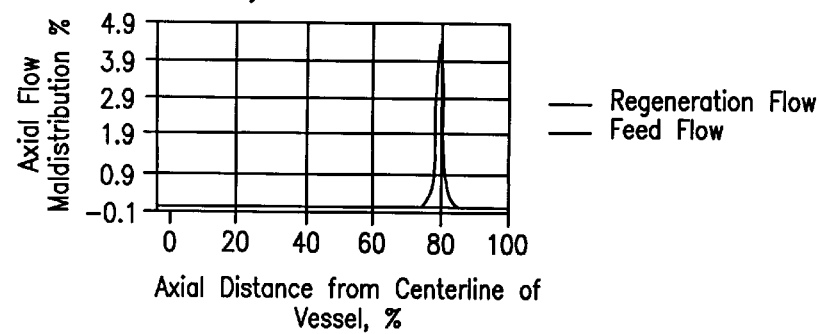

FIG. 4c shows that the flow mal-distribution with the perforated region arrangement of FIGS. 4a and 4b is further reduced to approximately 0.4% as a result of the inclusion of perforated region 50 in distributor arm 36.

Figure 5:
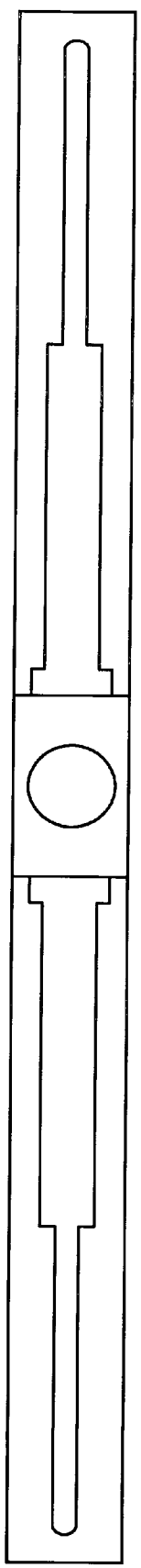
FIG. 5 is a top view of a third distributor embodiment.
Figure 6:
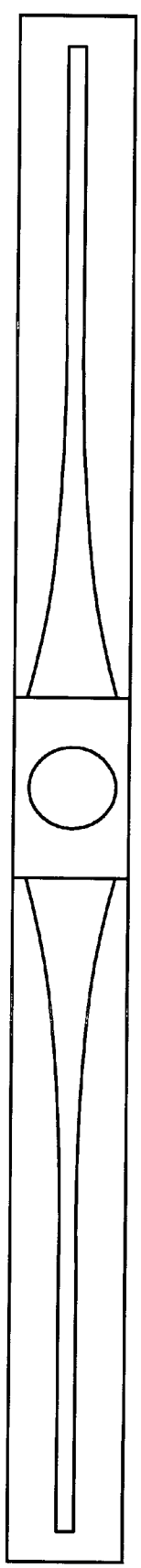
FIG. 6 is a top view of a fourth distributor embodiment.

FIG. 5 shows a stepped slit distributor arm embodiment that also exhibits a similar improvement in flow mal-distribution. FIG. 6 illustrates a curved profile slit distributor arm arrangement wherein the slit profile varies from the straight line arrangement shown in FIGS. 2a–2c. Note that each of the slit embodiments in FIGS. 5 and 6 can also be configured as perforation regions, similar to that shown in FIGS. 4a–4b.

It is preferred that the slits configured as 50% perforation regions be used as both inlet distributors and outlet accumulators. Although, radial mal-distribution is not affected by this arrangement, axial flow mal-distributions are drastically lowered to less than 1%.

Sieve movement, due to gas velocity across the surface of the bed during the regeneration flow, is a serious problem with prior art distributors. The maximum speed of regeneration flow over the bed is cut almost in half with the perforated slit distributor design. The maximum gas flow velocity, 1" above the bed was found to be lower for a variety of vessels (12 to 16 ft diameter; 20 to 60 ft length) with a perforated slit distributor constructed in accord with the invention.

A distributor incorporating the design of the invention works by controlling the gas flow leaving the conduit to be more uniform over the length of the conduit. The flow is also directed away from the bed rather than allowing it to exit over the entire conduit diameter as in the prior art design. This allows the velocity of the jet to decelerate before reaching the surface of the bed. The prior art design allowed the jet to impinge directly on the bed.

A 30" slit distributor for a large prepurifier (16' Dia. and 45' long) employs a slit having a triangular shape with a 15" base at the inlet of the conduit, located about 3" from the vessel wall. The vessel wall acts as a diffuser to distribute the axial flow evenly throughout the vessel. A smaller slit with no perforation region was studied but did not further improve the axial flow mal-distribution and increased the pressure drop. The pressure drop increased from 1.33 to 1.97 psi due to smaller slit. Therefore an optimum larger slit size should be used.

It is expected that a slit distributor incorporating the invention will result in longer $CO_2$ breakthrough time from the bed. As indicated above, it is preferred that a 50% open area curved perforation region be used to define the slit opening so as to direct the flow perpendicular to the pipe axis for further improvement of flow distribution. It is further preferred that the slit have a triangular shape with its base at the inlet Tee feed side and the vertex at the other end of the distributor arm. The angle of slit base was 60° in circumferential direction on the distributor arm.

Based on computational results, a prepurifier with a perforated slit distributor should maintain a low axial (maximum of 2%) mal-distribution for both feed and regeneration flows, regardless of the diameter and length of the vessel. A 2 ft bed with a 12 ft diameter, 60 ft long vessel was modeled to investigate the mal-distributions in shallow beds using a distributor design incorporating the invention. The maximum axial mal-distribution was 0.7%, with a low 3.9% maximum radial mal-distribution due to low bed thickness to vessel diameter ratio. The model showed that shallow beds would work without a problem with perforated slit distributors.

To study the effect of the distributor size on the flow mal-distribution, three different diameter distributors, namely 26", 29", 42", were used in a 16 ft diameter, 60 ft long vessel with a 6 ft. bed. These cases were solved for a feed flow. The three cases had similar low axial and radial mal-distributions, and were almost the same with respect to the flow distribution. Regarding the pressure drop, the total pressure drop of the system increased as the size of distributor decreased.

A 16 ft diameter and 45' long vessel with a perforated slit distributor was studied with different regeneration flows. The regeneration flow was initially cut in half, then doubled and finally was increased to four times of the original value. The axial and radial mal-distributions remained almost unchanged despite an eight times increase in flow.

The inlet Tee was included in the modeling to investigate any probable change in the flow distribution due to this addition. The addition of the inlet Tee to the vessels equipped with perforated slit distributors did not cause a major change in the flow distribution. The effect of inlet Tee size was also minor in these cases. The inlet Tee size played minor role when used with a perforated slit distributor while it had a major role in flow distribution when used with a standard distributor. The addition of a 36" inlet Tee to the model of the standard distributor generated a secondary, smaller axial mal-distribution peak at the end of Tee which reduced the primary (larger) axial flow mal-distribution peak to 12.1%.

The flow passing through the inlet Tee does not generally make a complete 90 degree angle turn before reaching the perforations and causes the flow to impact the perforated distributor at an angle. This impact allows a disproportionate amount of the flow out of the distributor at the end of inlet Tee and forms a secondary axial flow mal-distribution peak.

Therefore, horizontal prepurifiers with prior art distributors and inlet tees have actually two peaks for their axial flow mal-distributions. The loss of flow due to the secondary peak reduces the magnitude of the primary axial flow mal-distribution peak. A further increase of the inlet Tee size to 51" resulted in an even larger secondary peak which brought the primary peak to low 7.24% value. A slightly longer non-perforated section in the branch leg of the Tee will eliminate this effect and increase the axial peak at the end of the distributor.

A smaller slit was studied (30° at the base of opening) in the feed step and with no perforations in the slit. A smaller slit did not improve the axial mal-distribution, but increased the pressure drop. The pressure drop increased from 1.33 to 1.97 psi due to smaller slit.

To further smooth the velocity of the regeneration flow over the bed, additional single or multiple slits may be incorporated into the distributor arms to achieve a better balance between the flow jets over the bed.

The size of the slit can be optimized for certain applications. An optimum opening angle is in the range of 45° to 90°, with an approximate value of 60° is preferred. The shape of the slit can be non-uniform or can be triangular with non-linear or curved sides. The distributor can use a curved 50% perforated region in the slit to further improve the efficiency of separation. An optimum perforation ratio is from 20% to 60%. The perforated region can be flat rather than curved. The perforation distribution can be varied along the length of the slit. The conduit can be rectangular, ellipsoidal, square, or hexagonal. The vessel can be orientated vertically with proper bed supports. The working fluid can be a liquid rather than a gas.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for distributing a fluid within a vessel that includes an adsorbent bed, said apparatus comprising:
    an inlet fluid coupler;
    a conduit oriented adjacent a surface of said bed, said conduit having an inlet coupled to said inlet fluid coupler and a distal end; and slit-shaped fluid escape means in a wall of said conduit for enabling escape of a fluid therefrom, said slit-shaped fluid escape means extending along a length of said conduit, said slit-shaped fluid escape means having an opening extent near said inlet fluid coupler that is larger than an opening extent of said slit-shaped fluid escape means near said distal end.

2. The apparatus as recited in claim 1, wherein said slit-shaped fluid escape means is oriented towards a wall of said vessel and away from said bed so as to enable fluid flow that exits therefrom to impact upon said wall and be deflected thereby to said bed.

3. The apparatus as recited in claim 1 wherein said slit-shaped fluid escape means is defined by a region of said conduit that includes perforations.

4. The apparatus as recited in claim 3 wherein said perforations exhibit a perforation ratio of openings to surface area of said slit-shaped fluid escape means of from about 20% to 60%.

5. The apparatus as recited in claim 3 wherein said perforations exhibit a perforation ratio of openings to surface area of said slit-shaped fluid escape means of about 50%.

6. The apparatus as recited in claim 1, wherein said slit-shaped fluid escape means manifests edges that meet at said opening extent of said slit-shaped fluid escape means near said distal end, said edges causing said slit-shaped fluid escape means to manifest an elongated triangular shape with linear edges.

7. The apparatus as recited in claim 1, wherein said slit shaped fluid escape means manifests plural parallel edges having different spacings therebetween, said edges having a distal joining portion at said opening extent of said slit shaped fluid escape means near said distal end.

8. The apparatus as recited in claim 1, wherein said slit shaped fluid escape means manifests curved edges that meet at said opening extent of said slit shaped fluid escape means near said distal end, said curved edges causing said slit shaped fluid escape means to manifest a generally elongated triangular shape.

9. The apparatus as recited in claim 1 wherein said slit shaped fluid escape means exhibits an opening extent that encompasses a portion of a circumference of said conduit, said portion defined by an angular extent of about 45° to 90° extending from a centerline of said conduit.

10. The apparatus as recited in claim 1 wherein said slit shaped fluid escape means exhibits an opening extent that encompasses a portion of a circumference of said conduit, said portion defined by an angular extent of about 60° extending from a centerline of said conduit.

11. The apparatus as recited in claim 1 wherein said fluid is air.

12. An air prepurifier vessel including a distributor for distributing a gas within the vessel, said vessel including an adsorbent bed, said air prepurifier vessel comprising:

an inlet Tee-shaped coupler;

a pair of distribution conduits oriented adjacent a first surface of said bed, said distribution conduits having inlets coupled to feed exits of said inlet Tee-shaped coupler, each conduit having a distal end;

slit shaped fluid escape means in a wall of each said distribution conduit for enabling escape of a gas therefrom, said slit shaped fluid escape means extending along a length of each respective one of said distribution conduits, each said slit shaped fluid escape means having an opening extent near said inlet gas Tee-shaped coupler that is larger than an opening extent of said slit shaped fluid escape means near said distal end;

outlet coupler means;

a pair of accumulation conduits oriented adjacent a second surface of said bed, said accumulation conduits having outlets coupled to feed inlets of said outlet coupler, each accumulation conduit having a distal end; and slit shaped fluid escape means in a wall of each said accumulation conduit, said slit shaped fluid escape means extending along a length of each respective one of said accumulation conduits, each said slit shaped fluid escape means having an opening extent near said outlet coupler means that is larger than an opening extent of said slit shaped fluid escape means near said distal end.

13. The air prepurifier vessel as recited in claim 12, wherein each said slit shaped fluid escape means is oriented towards a wall of said vessel and away from said bed.

14. The air prepurifier vessel as recited in claim 12 wherein each said slit shaped fluid escape means is defined by a region of a conduit comprising perforations.

15. The air prepurifier vessel as recited in claim 14 wherein said perforations exhibit a perforation ratio of openings to surface area of said slit shaped fluid escape means of from about 20% to 60%.

16. The air prepurifier vessel as recited in claim 12, wherein each said slit shaped fluid escape means manifests edges that meet at said opening extent of said slit shaped fluid escape means near said distal end, said edges causing said slit shaped, fluid escape means to manifest an elongated triangle with linear edges.

17. The air prepurifier vessel as recited in claim 12, wherein said slit shaped fluid escape means manifests plural parallel edges having different spacings therebetween, said edges having a distal joining portion at said opening extent of said slit shaped fluid escape means near said distal end.

18. The air prepurifier vessel as recited in claim 12, wherein said slit shaped fluid escape means manifests curved edges that meet at said opening extent of said slit shaped fluid escape means near said distal end, said curved edges causing said slit shaped fluid escape means to manifest a generally elongated triangular shape.

19. The air prepurifier vessel as recited in claim 12 wherein said slit shaped fluid escape means exhibits an opening extent that encompasses a portion of a circumference of each said conduit, said portion defined by an angular extent of about 45° to 90° extending from a centerline of said conduit.

* * * * *